United States Patent [19]

Smith et al.

[11] Patent Number: 4,710,079

[45] Date of Patent: Dec. 1, 1987

[54] QUICK CHANGE SPINDLE ADAPTER FOR TOOL HOLDER

[75] Inventors: D. Frederick Smith, Rochester; James E. Goodsmith, Utica, both of Mich.

[73] Assignee: T. M. Smith Tool International Corp., Mount Clemens, Mich.

[21] Appl. No.: 943,825

[22] Filed: Dec. 29, 1986

Related U.S. Application Data

[63] Continuation of Ser. No. 743,365, Jun. 11, 1985, abandoned.

[51] Int. Cl.$^4$ .............................................. B23C 5/26
[52] U.S. Cl. ................................. 409/234; 279/1 L; 279/75; 279/82
[58] Field of Search ............... 409/232, 234; 279/1 B, 279/1 L, 22, 30, 32, 41 R, 42, 43, 44, 45, 75, 76, 81, 79, 80, 81, 99, 100, 108, 1 A

[56] References Cited

U.S. PATENT DOCUMENTS

| | | | |
|---|---|---|---|
| 3,091,473 | 5/1963 | Bilz | 279/82 |
| 3,851,890 | 12/1974 | Smith | 279/1 B |
| 3,893,677 | 7/1975 | Smith | 279/82 |
| 4,597,699 | 7/1986 | Ramunas | 409/232 |
| 4,643,623 | 2/1987 | Kondo et al. | 409/232 |

FOREIGN PATENT DOCUMENTS

| | | | |
|---|---|---|---|
| 1134473 | 4/1957 | France | 409/234 |
| 46525 | 2/1920 | Sweden | 279/81 |
| 948792 | 2/1964 | United Kingdom | 279/81 |
| 1136895 | 1/1985 | U.S.S.R. | 279/1 A |

*Primary Examiner*—William R. Briggs
*Attorney, Agent, or Firm*—Cullen, Sloman, Cantor, Grauer, Scott, & Rutherford

[57] ABSTRACT

In a quick change spindle adapter including a power rotated spindle having a bore adapted to receive a tool holder, a body secured upon the spindle and a retractable spring biased sleeve mounted on the body having a tapered inner wall. A tool holder mounting a tool projects into the body and has a shank loosely positioned within the spindle. A tapered collar on the tool holder extends into the body and is retainingly engaged by a series of spaced balls in the body with the balls projecting into engagement with the sleeve tapered wall retaining the tool holder and shank upon the spindle. The improvement comprises a conical recess within the end of the spindle defining an axial bearing and a centering cone on the tool holder is in snug engagement and axial registry with the bearing maintaining a self-alignment of the tool holder and spindle.

3 Claims, 4 Drawing Figures

QUICK CHANGE SPINDLE ADAPTER FOR TOOL HOLDER

This is a continuation of co-pending application Ser. No. 743,365 filed on June 11, 1985, now abandoned.

The present invention relates to a a tool holder and an adapter on a power driven spindle adapted to retain tool holder and a tool, with the tool holder shank retained within the spindle by a plurality of spaced balls acting upon an angular collar on the tool holder and a tapered inner surface upon a retractable retaining sleeve on the spindle.

BACKGROUND OF THE INVENTION

Heretofore in the use of spindle adapters for tool holders, various structures have been used to removably mount and anchor a tool holder upon a power driven spindle incorporating an adapter assembly yieldably mounted upon the spindle including a series of balls cooperatively receiving and retainingly engaging the tool holder.

One of the difficulties in such assemblies is that the tool holder shank is slidably positioned within the axial bore of the spindle. Due to the looseness of the mounting of the tool holder shank within the spindle there is predictably some angular deflection of the tool holder and tool mounted thereon with respect to the longitudinal axis of the spindle. The difficulty with such mounting and assembly of the tool holder within and with respect to a power rotated spindle and employing a quick change adapter assembly upon the spindle is that there will be some angular deflection of the longitudinal axis of the tool holder and tool with respect to the fixed longitudinal axis of the spindle. This causes a corresponding angular deflection of the tool projecting from the holder and accordingly an inaccuracy in the drilling, boring or reaming of the tool with respect to a fixed workpiece.

THE PRIOR ART

Illustrative of the prior art is Applicant's U.S. Pat. No. 3,893,677 of July 8, 1975 entitled Quick Change Spindle Adapter for Tool Holder.

SUMMARY OF THE INVENTION

An important feature of the present invention is to provide a construction and assembly between the tool holder and the spindle such as will maintain the axis of the tool holder and the tool in substantial alignment with the axis of the power rotated spindle preventing angular deflection of the tool.

An important feature is to provide upon the spindle a conical recess defining an axial bearing, and to provide upon the tool holder a centering cone therearound adapted for snug operative and axial registry within said bearing for maintaining an axial self-alignment of the tool holder and spindle.

Another feature is to provide an included angle between the respective tapered surfaces of the centering cone and conical bearing in the range of 40° to 60° and in the preferred embodiment, 50° approximately.

A further feature includes a tapered collar upon the tool holder operatively engaged by a plurality of circularly spaced balls mounted upon a body secured to and projecting from the spindle, in conjunction with a retractable spring biased sleeve having an inner tapered surface engageable with the balls, adapted for operative retaining engagement with the tapered collar upon the tool holder. The tool holder and corresponding centering cone are axially biased inwardly into operative engagement with the conical bearing on the spindle during power rotation thereof.

Another feature is to provide the centering cone as an integral part of the tool holder intermediate its ends.

As a further feature the centering cone may be in the form of a ring secured upon the tool holder shank as by pressing thereon or in the case of a threaded shank mounted upon a nut threadedly engaging the tool holder shank.

Another feature is to provide upon the exterior thread of the tool holder shank a nut threaded thereon which includes a cylindrical shank positioned within the body on said spindle upon which is mounted and secured a tapered collar of ring shape and adjacent thereto a tapered centering cone, wherein on longitudinal adjustment of the nut with respect to the shank is secured in position by a set screw.

Another feature includes a positive drive screw threaded within an internally threaded bore of the tool holder shank and having a slotted portion adapted as a stop for the inner end of a tool projected axially thereinto. The inner end of a tool has a flat portion retainingly engaged by the slotted portion for transmitting the torque of the tool holder to said tool.

These and other features and objects will be seen from the following Specification and claims in conjunction with the appended drawing.

THE DRAWING

It will be understood that the above drawing illustrates merely preferred embodiments of the invention and that other embodiments are contemplated within the scope of the claims hereafter set forth.

DETAILED DESCRIPTION OF AN EMBODIMENT OF THE INVENTION

Figure 1:
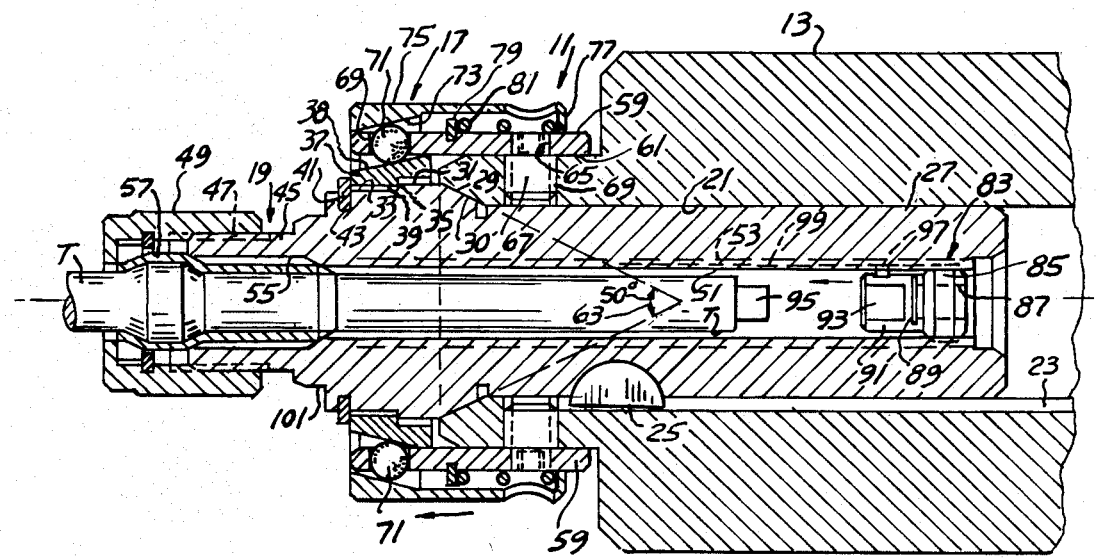
FIG. 1 is a longitudinal partly sectioned view of the assembled quick change adapter, power driven spindle and tool holder assembly.
Figure 2:
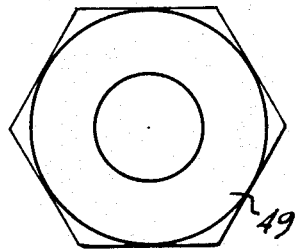
FIG. 2 is an end view thereof on increased scale.

Referring to the drawing, a spindle, adapter and tool holder assembly is shown at 11 in FIG. 1 and represents an improvement over U.S. Pat. No. 3,893,677 of July 8, 1975 entitled Quick Change Spindle Adapter for Tool Holder. A substantial portion of the disclosure herein is directed to the structure, function and operation similar to that disclosed in the above disclosed U.S. Pat. No. 3,893,677. The full detail and operation of the quick change adapter is incorporated herein by reference.

Figure 3:
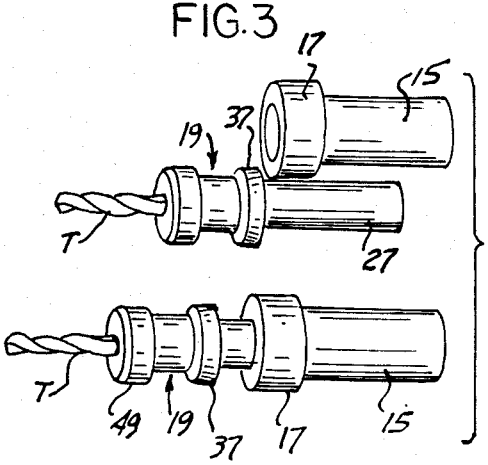
FIG. 3 is a bracketed view of a power driven spindle with adapter and a tool holder assembly having a shank and mounting a tool and wherein the tool holder is axially assembled upon the spindle.

In the illustrative embodiment a stub spindle 13 is provided which is power rotated in a conventional manner, and a standard spindle 15 is shown in FIG. 3. The present invention is adapted for use in conjunction with either type spindle.

An over the spindle adapter assembly 17 is mounted upon spindle 13, for illustration, and is adapted to receive and retain the tool holder assembly 19 mounting a tool T which may be a drill, a reamer or a boring tool for illustration.

Spindle 13, or the corresponding standard spindle 15 has an axial bore 21 which may be Acme bore or other bore and includes along its length the interior keyway or slot 23. Conventional key 25 is secured upon shank 27 of the tool holder assembly 19 intermediate its ends. Upon a axial assembly of the shank 27 into the bore 21 of the spindle, said key is slidably positioned along keyway 23, FIG. 1, for rotation with said spindle.

Centering cone 29 is formed upon or mounted upon tool holder shank 27 adjacent one end thereof. Said centering cone on the tool holder upon axial insertion within the spindle bore 21 is adapted for cooperative engaging registry with centering conical taper 30 upon the inner end of spindle 13. Said taper forms a conical bearing surface.

The tool holder assembly 19 includes the head 31 forwardly of centering cone 29 and has an annular formation or collar support 33 which forms with head 31 stop shoulder 35. Taper collar 37 has a tapered surface 38 and is inclined rearwardly and outwardly. Upon the interior of taper collar 37 there is an annular anchor flange 39 which extends to collar support 33 and at one end is in operative engagement with stop shoulder 35. Annular snap ring 41 is nested within a corresponding annular groove 43 within head 31 and is in operative retaining engagement with tapered collar 37.

The tool holder assembly forwardly of head 31 has a head extension 45 threaded at 47 along its length and is adapted to have adjustably threaded thereover nose piece 49, as a means for mounting split collet 57 for receiving and securing tool T, fragmentarily shown. Said tool extends inwardly along the length of internal bore 51 of shank 27. The shank bore 51 is interiorly threaded at 53 and at its outer end has a counter bore 55 which receives portions of split tool collet 57.

The taper or included angle between opposing surfaces of centering cone 29 and conical bearing surface 30 is preferably arranged at 50°, approximately as shown at 63, FIG. 1. It is contemplated that this angle could range between 40° to 60°, for illustration.

Cylindrical body 59 is mounted over a portion of power driven spindle 13, FIG. 1, has an internal uniform bore 61 and extends forwardly of said spindle. Said body 59 has a radial bore 65 through which projects the Allen screw 67 which is threaded into a corresponding radial aperture 69 in spindle 13.

In a conventional manner, a plurality of circularly spaced balls 71, the same as disclosed in U.S. Pat. No. 3,893,677, are positioned and movably retained within corresponding spaced apertures 69 within body 59. Interior portions of balls 71 extending radially inward of body 59 and are adapted for operative engagement with tapered collar 37–38. Outer portions of balls 71 extend radially outward of body 59 and are adapted to operatively engage the tapered wall 73 upon the interior of spring biased sleeve 75, forming a part of the over the spindle adapter assembly 17.

In the illustrative embodiment sleeve 75 at one end has an internal annular shoulder 77 which is loosely positioned over body 59 and is adapted to engage one end of the compression spring 81, FIG. 1. Split ring 79 is partly nested and secured within a forward portion of body 59 and retainingly engages the other end of coil spring 81. Said spring surrounds body 59 upon the interior of retractable sleeve 75.

The function of the compression spring 81 is to bias sleeve 75 rearwardly with respect to body 59 so that the balls 71 under the control of the interior tapered surface 73 operatibely and retainingly engage the exterior tapered surface 38 of tapered collar 37.

The sleeve 75 is adapted for manual forward movement against the action of spring 81 by which the balls 71 are adapted to move laterally outward for disengagement from tapered collar 37. This permits a quick change or removal of the tool holder assembly 19 from the spindle and further permits the quick application of a tool holder and its shank into the spindle and interlocked with the quick change adapter assembly 17. The tool holder is axially secured to the spindle for rotation therewith.

The interior tapered surface 73 of sleeve 75 and tapered surface 38 of collar 37 extend rearwardly and outwardly. The respective tapered surfaces 73 and 38 converge towards each other forwardly, FIG. 1.

The interior rearwardly tapered surface 73 of sleeve 75 provides a binding angle with respect to collar 37 and balls 71 therebetween. With the arrangement shown in FIG. 1, the internal tapered wall 73 of said sleeve is in cooperative wedging and engaging registry with balls 71 which in turn retainingly register with collar 37 on the tool holder. In the assembled position of the tool holder with respect to the spindle collar 37 is nested upon the interior of body 59 where it projects forwardly of spindle 13.

Any outward thrust upon the tool T or tool holder 19 causes the balls 71 to rotate. Said balls frictionally engage the outer sleeve and tend to force the same axially inwardly. This tends to increase its retaining force on the balls and to more tightly anchor the tool holder against such displacement. Any outward force on collar 37 causes the balls to roll inwardly for further anchoring the tool holder. Since the surface 73 and the outer surface 38 of the collar 37 converge forwardly, there is provided an increased wedging and holding force for anchoring and securing the tool holder against accidental dislodgement from body 79. This is substantially in accordance with the disclosure of U.S. Pat. No. 3,893,677.

The important feature of the present invention is the use of centering cone 29 upon the tool holder as assembled with respect to the spindle in operative registry within the conical bearing surface 30 upon the inner end of spindle 13. Essentially the function of the centering cone 29 as it nests within conical bearing surface 30 of the spindle is to provide for self-aligning by which the tool holder assembly 19 and the attached tool T are maintained against angular deflection with respect to the longitudinal axis of spindle 13.

A positive tool drive assembly 83 is shown in FIG. 1 which includes the screw 85 having a square or hex socket 87 on one end thereof and upon its inner end, an annular snap flange 89 which extends within a corresponding annular recess upon one end of the tool driver 91 having transverse drive slot 93. In the illustrative embodiment, the positive tool drive assembly 83 may be advanced longitudinally relative to threaded bore 53 of shank 27 until the drive slot 93 is in registry with and receives a corresponding tool flat 95 upon the inner end of tool T. Said tool projects into shank 27 along a portion of its length. In the illustrative embodiment a key 97 is mounted upon tool driver 91 and rides within an internal slot or keyway 99 adjacent and along internal bore 51 of shank 27. The forward portion of the head 31-35 of the tool holder assembly includes a pair of wrench engaging flat surfaces 101 by which the tool holder may be rotated relative to spindle 13.

MODIFICATION

Figure 4:
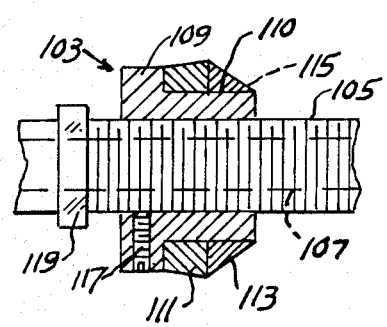
FIG. 4 is a fragmentary section of a modification wherein the tool holder shank is exteriorly threaded and mounts a nut adjustable thereon supporting the tapered collar and centering cone.

A modified tool holder assembly is fragmentarily shown at 103, FIG. 4 and wherein the shank 105 is exteriorly threaded and has an internal bore 107 adapted to receive the tool T, the same as in FIG. 1. Anchor nut 109 is threaded over shank 105 and includes a cylindrical portion 110.

The tapered collar 111 in the form of an annular ring is positioned over cylindrical portion 110 of nut 109 and suitably retained thereon. In the illustrative embodiment, FIG. 4, the corresponding centering cone 113 is in the form of an annular ring which is snugly mounted or pressed upon cylindrical portion 110 of nut 109 and suitably secured thereto as at 115. A set screw 117 extends through a radial aperture in nut 109 and is in operative retaining engagement with shank 105 so that the nut once adjusted upon shank may be secured in position. A pair of wrench engaging flat surfaces 119 form a part of shank 105.

As shown in FIG. 1, the positive drive assembly 83 provides a means by which upon suitable longitudinal adjustment thereof within shank 27, the slotted portion 93 of drive member 91 receives and is in operative engagement with the corresponding flat 95 on tool T. Any torque transmitted to shank 27, by said spindle is further transmitted to the positive drive assembly 93 and that torque delivered directly to tool T.

Having described our invention, reference should now be had to the following claims:

We claim:

1. In a spindle, adapter and tool holder assembly including a power rotated spindle having a bore and a forward end adapted to receive a tool holder, a cylindrical body having a uniform axial bore mounted upon and secured to said spindle and projecting forwardly thereof, a retractable spring biased sleeve movably mounted on the body and including a tapered inner wall, a tool holder mounting a tool projected into said body having a shank at its inner end slidably positioned in the spindle bore and keyed to said spindle and a tapered collar on said tool holder intermediate its ends projecting into said body, there being a series of spaced balls movably nested in and around said body, portions of said balls projecting radially inward retainingly engaging said collar and projected radially outward in cooperative engagement with said tapered inner wall, the tapered sleeve inner wall converging relative to the collar providing a cooperative wedging action of the balls between the collar and sleeve inner wall for anchoring the tool holder within said body and against the end of said spindle whereby manual retraction of said sleeve releases said balls facilitating assembly into and manual removal of said tool holder from said body and spindle;

the improvement comprising a conical recess within the inner bore surface at the forward end of said spindle defining an axial bearing;

and a centering cone upon and around said tool holder adjacent and forwardly of said shank in snug axial registry with said bearing maintaining an axial self-alignment of said tool holder and spindle; said sleeve inner wall and said collar having surfaces tapered rearwardly and outwardly so that said sleeve and balls exert an inward axial thrust upon said tool holder and shank biasing said centering cone against and into said conical spindle bearing.

2. In the tool holder assembly of claim 1, the tapered collar upon the tool holder being circular in cross-section, and an internal annular flange upon said collar mounted upon a portion of said tool holder at one end bearing against a stop shoulder thereon;

and a locking ring mounted upon said tool holder retainingly engaging said collar against axial displacement.

3. In a quick change spindle adapter for a power driven spindle having a bore and a forward end, adapted to receive a tool holder having a shank at its inner end, a cylindrical body on and projecting from the spindle, a retractable spring biased sleeve mounted on the body having an internal taper engaging a series of balls mounted within the body and extending from its opposite sides for operative engagement with a tapered collar on the tool holder for operatively retaining the tool holder within and upon the spindle;

the improvement which comprises a conical recess within the inner bore surface at the forward end of said spindle defining an axial bearing;

and a centering cone upon and around said tool holder intermediate its ends and forwardly of said shank in snug operative and axial registry with said bearing maintaining an axial self-alignment of said tool holder and spindle; said spindle adapter biasing said balls against said tapered collar for biasing said centering cone into continuous inward engagement and nesting within said spindle bearing.

* * * * *